(12) United States Patent
Yu (10) Patent No.: US 8,109,562 B2
(45) Date of Patent: Feb. 7, 2012

(54) ROOF RAIL FOR VEHICLE

(75) Inventor: Jong Duk Yu, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/776,135

(22) Filed: May 7, 2010

(65) Prior Publication Data

US 2011/0133521 A1    Jun. 9, 2011

(30) Foreign Application Priority Data

Dec. 3, 2009 (KR) .................. 10-2009-0119145

(51) Int. Cl.
*B62D 25/06* (2006.01)

(52) U.S. Cl. ............... 296/210; 296/187.13; 296/193.12

(58) Field of Classification Search ................... 296/210, 296/187.07, 187.13, 193.12, 193.01, 187.03, 296/187.12
See application file for complete search history.

(56) References Cited

U.S. PATENT DOCUMENTS

| | | | |
|---|---|---|---|
| 5,681,076 A | 10/1997 | Yoshii | |
| 6,027,160 A * | 2/2000 | Brodt et al. | 296/210 |
| 6,543,841 B1 * | 4/2003 | Ohkubo | 296/210 |
| 7,165,806 B2 * | 1/2007 | Osterberg et al. | 296/203.03 |
| 7,213,874 B2 * | 5/2007 | Osterberg et al. | 296/210 |
| 7,543,884 B2 * | 6/2009 | Reed et al. | 296/210 |
| 7,604,286 B2 * | 10/2009 | Watanabe et al. | 296/210 |
| 7,758,109 B2 * | 7/2010 | Reed et al. | 296/210 |
| 7,922,239 B2 * | 4/2011 | Mathes et al. | 296/210 |
| 7,954,883 B2 * | 6/2011 | Benkler et al. | 296/187.05 |
| 2006/0202520 A1 | 9/2006 | Osterberg et al. | |
| 2008/0129025 A1 * | 6/2008 | Ratajski et al. | 280/735 |
| 2009/0212602 A1 | 8/2009 | Reed et al. | |
| 2011/0121614 A1 * | 5/2011 | Kobayashi et al. | 296/210 |

FOREIGN PATENT DOCUMENTS

| | | |
|---|---|---|
| JP | 61-24671 A | 2/1986 |
| JP | 8-113161 A | 5/1996 |
| JP | 9-132165 A | 5/1997 |
| JP | 2002-308145 A | 10/2002 |
| JP | 2006-205870 A | 8/2006 |
| JP | 2008-195361 A | 8/2008 |
| KR | 92-21374 U | 12/1992 |
| KR | 20-1998-025667 Y1 | 8/1998 |
| KR | 20-0160228 Y1 | 8/1999 |
| KR | 20-2000-0004272 Y1 | 3/2000 |
| KR | 10-0327769 B1 | 8/2002 |
| KR | 10-2005-0117208 A | 12/2005 |
| KR | 10-2008-0052745 A | 6/2008 |

* cited by examiner

*Primary Examiner* — Jason S Morrow

(74) *Attorney, Agent, or Firm* — Morgan, Lewis & Bockius LLP (57) ABSTRACT

A roof rail reinforcement device for a vehicle, may include at least a reinforcement attached to a roof rail to increase rigidity, and having a cut part formed by cutting a portion of a flange thereof to ensure therethrough a first sealer applying position formed at a distal end of the roof rail, thus allowing a mastic sealer to be applied to the distal end of the roof rail.

10 Claims, 7 Drawing Sheets

< Sectional view of C-C >

FIG.1 (Prior art)

< Sectional view of A-A >

< Sectional view of B-B >

< Sectional view of C-C >

FIG.9

< Sectional view of D-D >

ROOF RAIL FOR VEHICLE

CROSS-REFERENCE TO RELATED APPLICATION

The present application claims priority to Korean Patent Application No. 10-2009-0119145 filed Dec. 3, 2009, the entire contents of which is incorporated herein for all purposes by this reference.

BACKGROUND OF THE INVENTION

1. Field of the Invention

The present disclosure relates to a roof rail for a vehicle. More particularly, it relates to a roof rail for a vehicle which is reinforced using a reinforcement to provide improved resistance to side impact and improved roof strength to the roof rail.

2. Description of Related Art

Generally, the roof rails of a vehicle are reinforcing devices which are installed to a roof panel in such a way as to extend in a transverse direction, and include a front rail, a rear rail, a center rail, etc.

The roof rails are adhered to the lower surface of the roof panel by a mastic sealer.

Currently, roof rails are being used in many car companies. In order to mount the roof rails, mastic sealer application equipment and an assembly jig are prepared.

Figure 1:
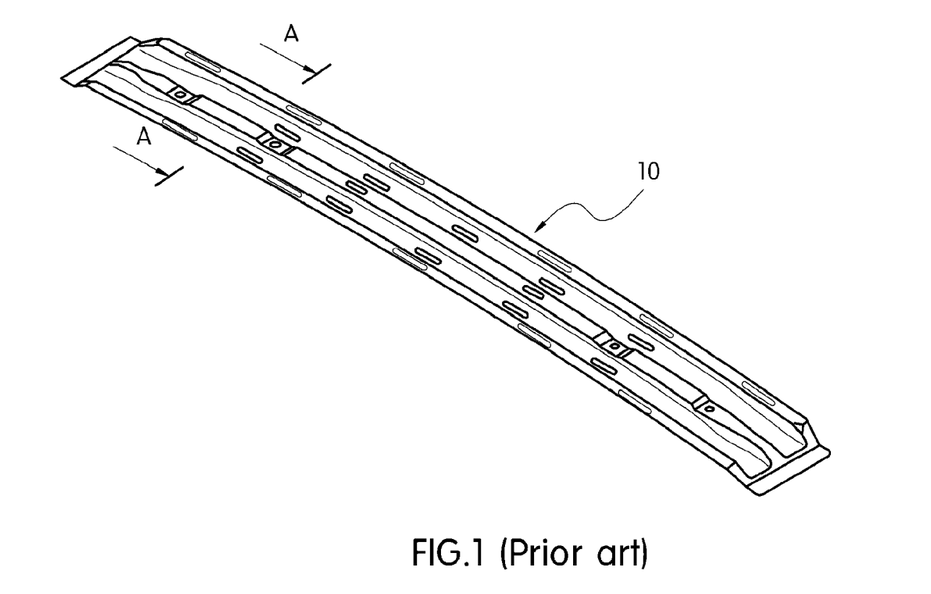
FIG. 1 is a perspective view illustrating a conventional roof rail.
Figure 2:
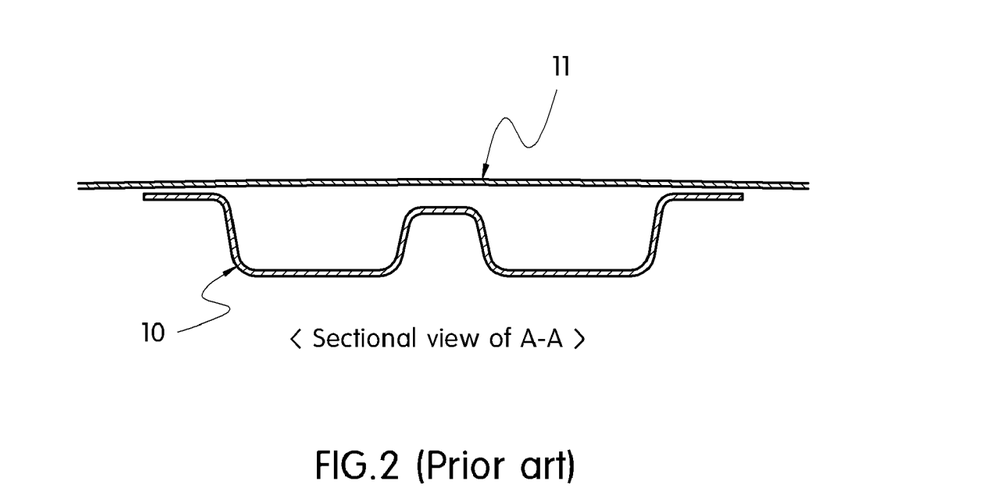
FIG. 2 is a sectional view taken along line A-A of FIG. 1.

FIGS. 1 and 2 are a perspective view and a sectional view, respectively, illustrating a conventional roof rail.

As shown in FIGS. 1 and 2, the roof rail 10 has a section which is bent twice in a "U" shape in a transverse direction thereof. Such a roof rail 10 is problematic in that it cannot sufficiently satisfy regulations concerning crashworthiness and increase in marketability.

Unexplained reference numeral 11 denotes a roof panel.

Figure 3:
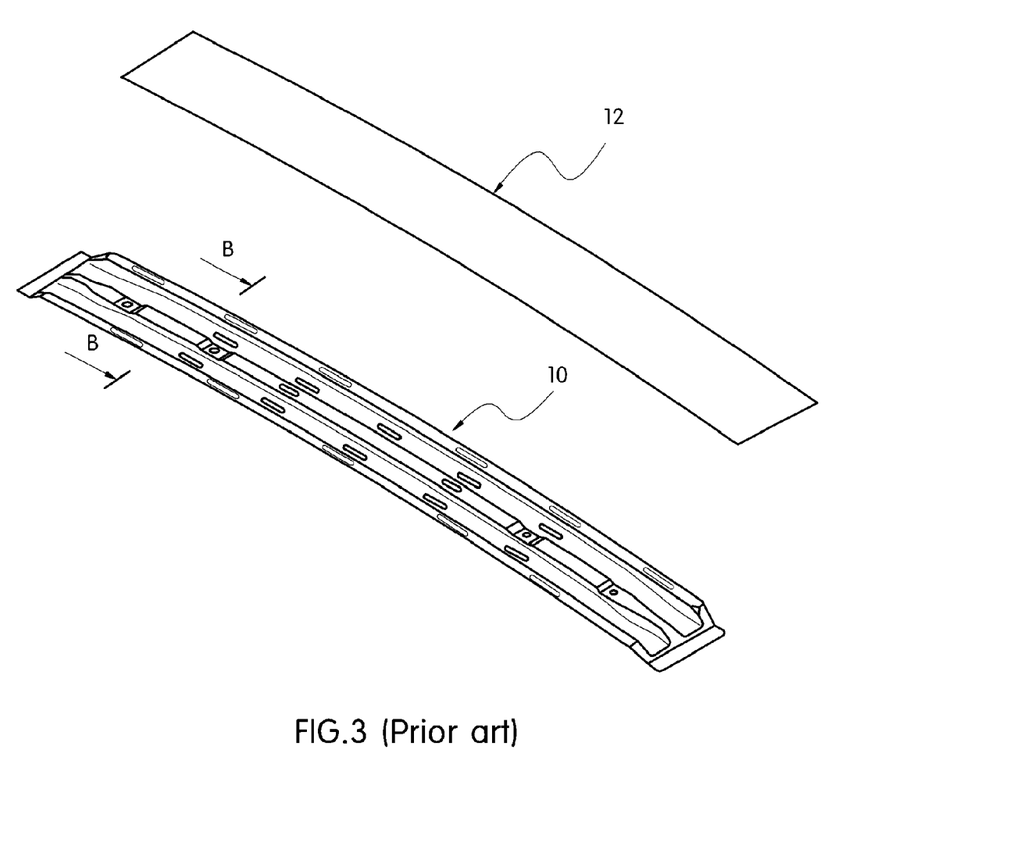
FIG. 3 is a perspective view illustrating another conventional roof rail.
Figure 4:
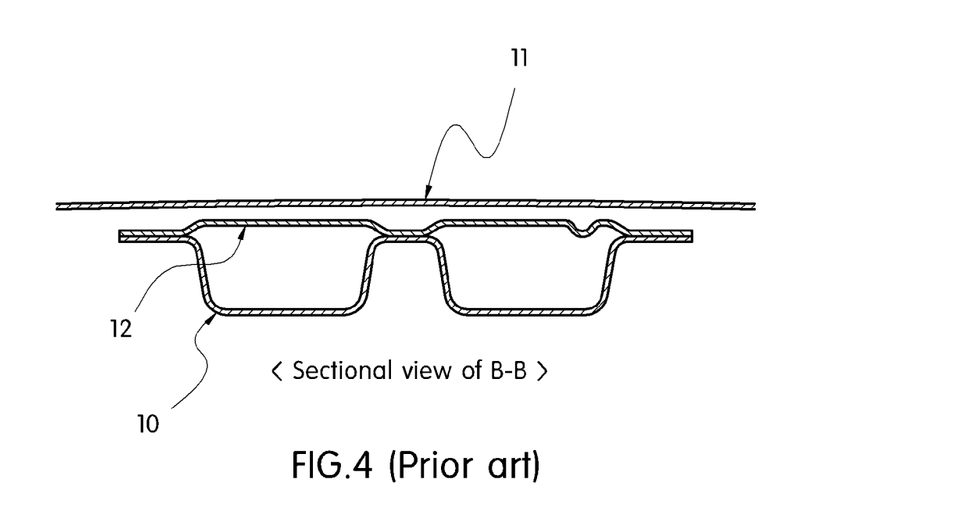
FIG. 4 is a sectional view taken along line B-B of FIG. 3.
Figure 5:
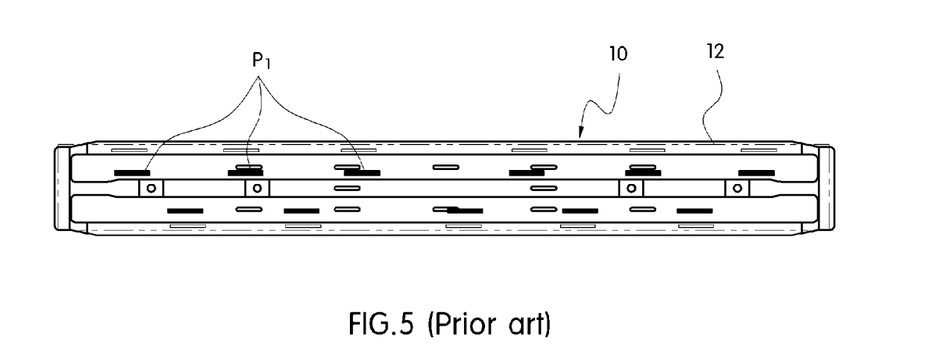
FIG. 5 is a plan view illustrating the roof rail of FIG. 3.

FIGS. 3 to 5 are a perspective view, a sectional view and a plan view, respectively, illustrating another conventional roof rail.

As shown in FIGS. 3 to 5, the roof rail 10 includes a reinforcement 12 to increase the size of the section and thickness of the roof rail 10.

That is, the reinforcement is added to the existing roof rail, thus improving performance.

Here, the roof rail 10 and the reinforcement 12 are joined together through welding.

Further, unexplained reference numeral 11 denotes a roof panel.

Such a reinforcing structure achieves improvement in roof strength and crashworthiness.

However, the roof rail 10 is problematic in that mastic sealer applying positions $P_1$ must be changed inwards in a transverse direction thereof to avoid interference with welded parts of the roof rail 10 and the reinforcement 12.

Hence, a distance between a longitudinal end of the roof rail 10 and a sealer applying surface is long, so that the end of the rail 10 may be detached, thus causing reduction in rigidity. The reinforcement is attached to the roof rail 10 throughout its entire length, thus causing excessive increase in weight and manufacturing cost.

Figures 6, 7:
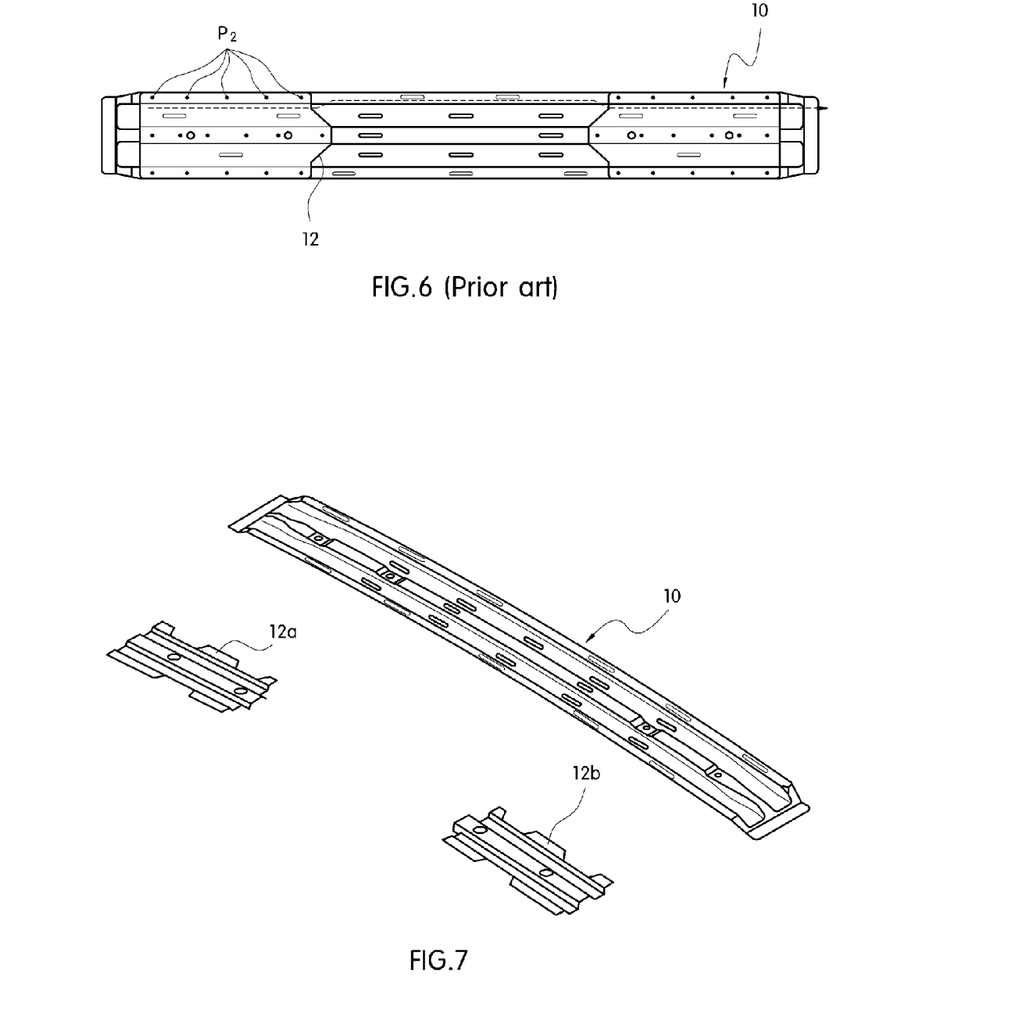
FIG. 6 is a plan view illustrating a further conventional roof rail.
FIG. 7 is an exploded perspective view illustrating an exemplary roof rail according to the present invention.

FIG. 6 is a plan view illustrating a further conventional roof rail.

FIG. 6 shows a partial reinforcement type roof rail 10 which is constructed so that reinforcements 12 are attached to only the opposite ends of the roof rail 10.

However, the partial reinforcement type roof rail 10 is problematic in that there is difficulty in applying the mastic sealer by a robot in a body assembly line.

For example, mastic sealer application equipment applies a sealer while moving in a straight line. The partial reinforcement type roof rail is problematic in that sealer applying positions must avoid welding points $P_2$ between the roof rail 10 and the reinforcements 12, so that a sealer applying direction is bent as shown by the arrow of the drawing, and it is impossible to use existing equipment. Consequently, a worker must apply the mastic sealer manually, so that workability is poor, and there is difficulty in guaranteeing good quality.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provides a novel roof rail for a vehicle which has reinforcements on the opposite ends of the roof rail to increase resistance to side impact and roof strength, and which changes the shape of each reinforcement to allow a mastic sealer to be effectively applied, thus increasing the rigidity of the weak part of the roof rail, realizing a reduction in total weight, and ensuring a proper seat for applying the mastic sealer, therefore enhancing the application efficiency of the mastic sealer.

In one aspect of the present invention, the roof rail reinforcement device for a vehicle, may include at least a reinforcement attached to a roof rail to increase rigidity, and having a cut part formed by cutting a portion of a flange thereof to ensure therethrough a first sealer applying position formed at a distal end of the roof rail, thus allowing a mastic sealer to be applied to the distal end of the roof rail.

The at least a reinforcement may have a cross-section which is bent in a "W" shape in a transverse direction thereof and includes concave portions and a lower portion formed between the concave portions.

The concave portions of the at least a reinforcement may be received between corresponding lateral sides of the roof rail and a corresponding lateral side of the roof rail and a corresponding concave portion are spaced with a predetermined distance, wherein the lower portion is fixed to the roof rail.

The first sealer applying portion of the roof rail may be overlapped to the cut part of the at least a reinforcement to allow the mastic sealer to be applied thereto through the cut part.

In another aspect of the present invention, the at least a reinforcement may include a first reinforcement and a second reinforcement which are attached, respectively, to opposite distal ends of the roof rail, each of the first and second reinforcements having a cut part formed by cutting a portion of a flange thereof to ensure therethrough a first sealer applying position formed at a distal end of the roof rail, thus allowing a mastic sealer to be applied to the distal end of the roof rail.

As described above, the roof rail for the vehicle according to the present invention provides the following effects.

First, reinforcements are added to the opposite ends of the roof rail which are weak and are thus bent in the event of side impact, thus increasing the rigidity of the weak part, in addition to minimizing increase in weight and manufacturing cost.

Second, the roof rail and the reinforcement are welded to each other through five-surface matching, thus maximizing rigidity.

Third, the reinforcement is shaped to allow the mastic sealer to be applied, thus minimizing increase in the weight of the reinforcement.

Fourth, the reinforcement is provided with a cut part, thus ensuring the seat for applying the mastic sealer when the sealer is applied to the upper surface of the roof rail, and permitting the application of the sealer under the same conditions as the conventional roof rail. Therefore, additional equipment investment is not required in a body assembly line.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIGS. 7 to 11 are an exploded perspective view, a perspective view, sectional views, a plan view and an enlarged view, respectively, illustrating a roof rail according to an embodiment of the present invention.

As shown in FIGS. 7 to 11, the roof rail 10 has reinforcements on the opposite ends thereof, thus structurally reinforcing the ends of the roof rail 10 which are weak and thus bent in the event of side impact. In particular, the shape of the reinforcement is changed to ensure a seat for applying the mastic sealer, thus allowing mastic sealer application work to be efficiently conducted.

Figure 8:
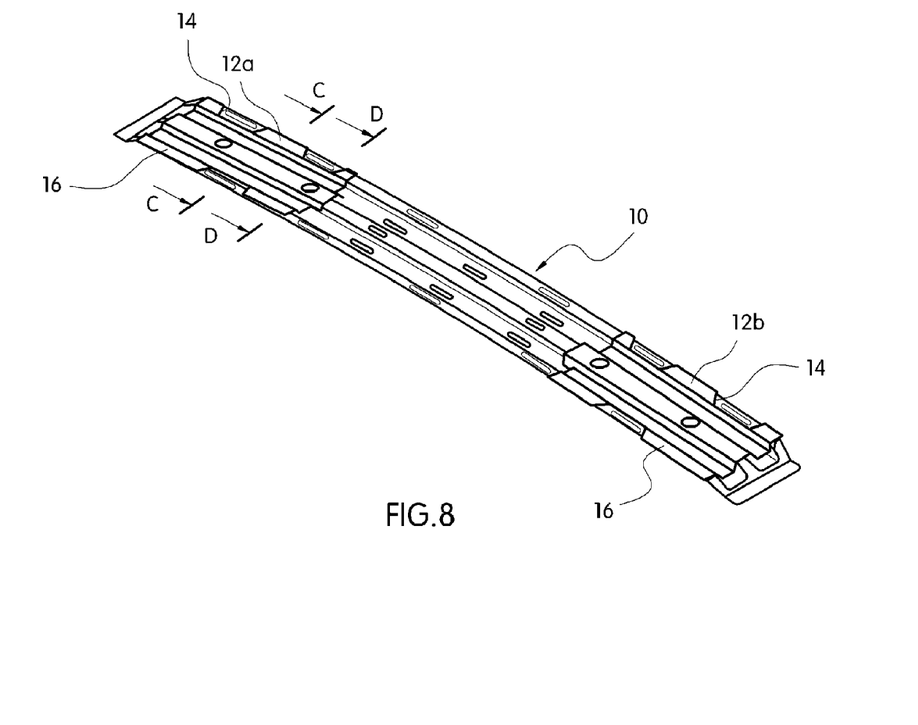
FIG. 8 is a perspective view illustrating the exemplary roof rail according to the present invention.
Figure 9:
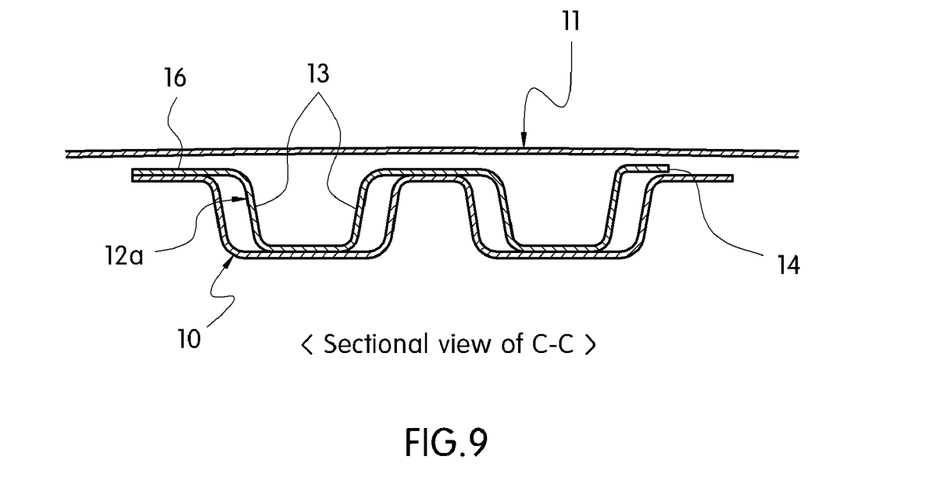
FIGS. 9 and 10 are sectional views taken along line C-C and line D-D of FIG. 8, respectively.

To this end, a first reinforcement 12a and a second reinforcement 12b, each having a length which is equal to about a quarter of the length of the roof rail 10, are attached to the opposite ends of the roof rail 10. Here, the first reinforcement 12a and the second reinforcement 12b are integrated with the roof rail 10 through welding.

Figure 10:
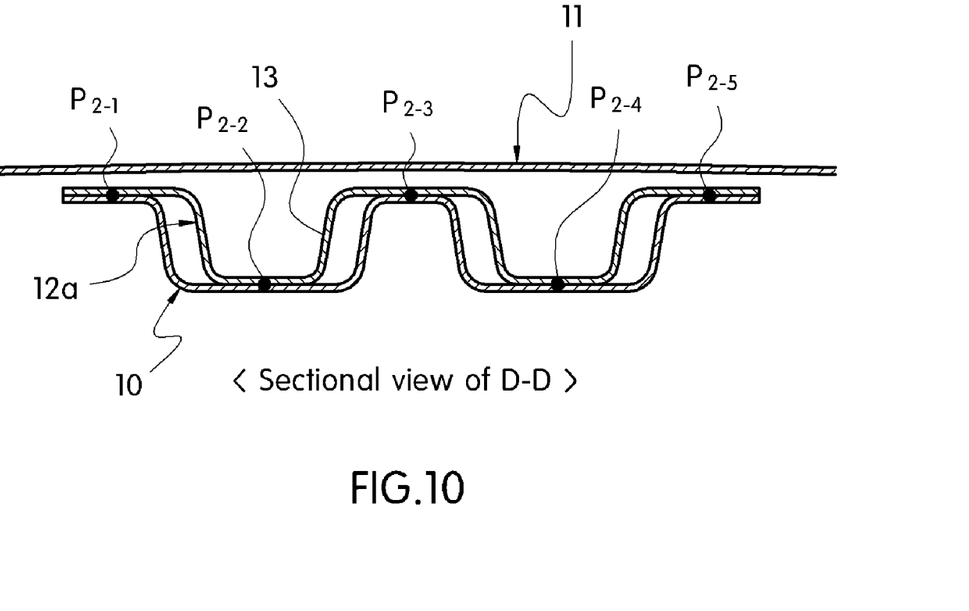

Particularly, each of the first and second reinforcements 12a and 12b has a bent section which has two concave portions 13 arranged at regular intervals in a transverse direction. Thus, when the reinforcements 12a and 12b overlap the roof rail 10, each concave portion 13 is in contact with the "W"-shaped bent part of the roof rail 10 to be received therein. In this state, each reinforcement is welded to the roof rail 10 through five contact surfaces. That is, as shown in FIG. 10, when seeing the first or second reinforcement 12a or 12b and the roof rail 10 in a transverse section, the first or second reinforcement 12a or 12b and the roof rail 10 are welded to each other through five contact points, that is, five welding points P2-1, P2-2, P2-3, P2-4, and P2-5, thus maximizing rigidity against side impact in an exemplary embodiment of the present invention.

In an exemplary embodiment of the present invention, the lateral side of the roof rail and the concave portion 13 of the first and second reinforcements 12a and 12b are spaced with a predetermined distance.

Such a section shape of the reinforcement provides rigidity which is structurally strengthened, in comparison with the straight-line shaped section of the conventional reinforcement.

Further, the first and second reinforcements 12a and 12b are shaped to enhance the efficiency of mastic sealer application work.

To this end, cut parts 14 are provided on the longitudinal ends of each of the first and second reinforcements 12a and 12b. In an exemplary embodiment of the present invention, each of the first and second reinforcements 12a and 12b may include flanges 16 at a lateral side thereof and the cut part 14 may be formed in the flanges 16. When the reinforcements 12a and 12b overlap the roof rail 10, the cut parts 14 allow the sealer applying positions $P_1$ to be ensured at the longitudinal ends of the roof rail 10.

Figure 11:
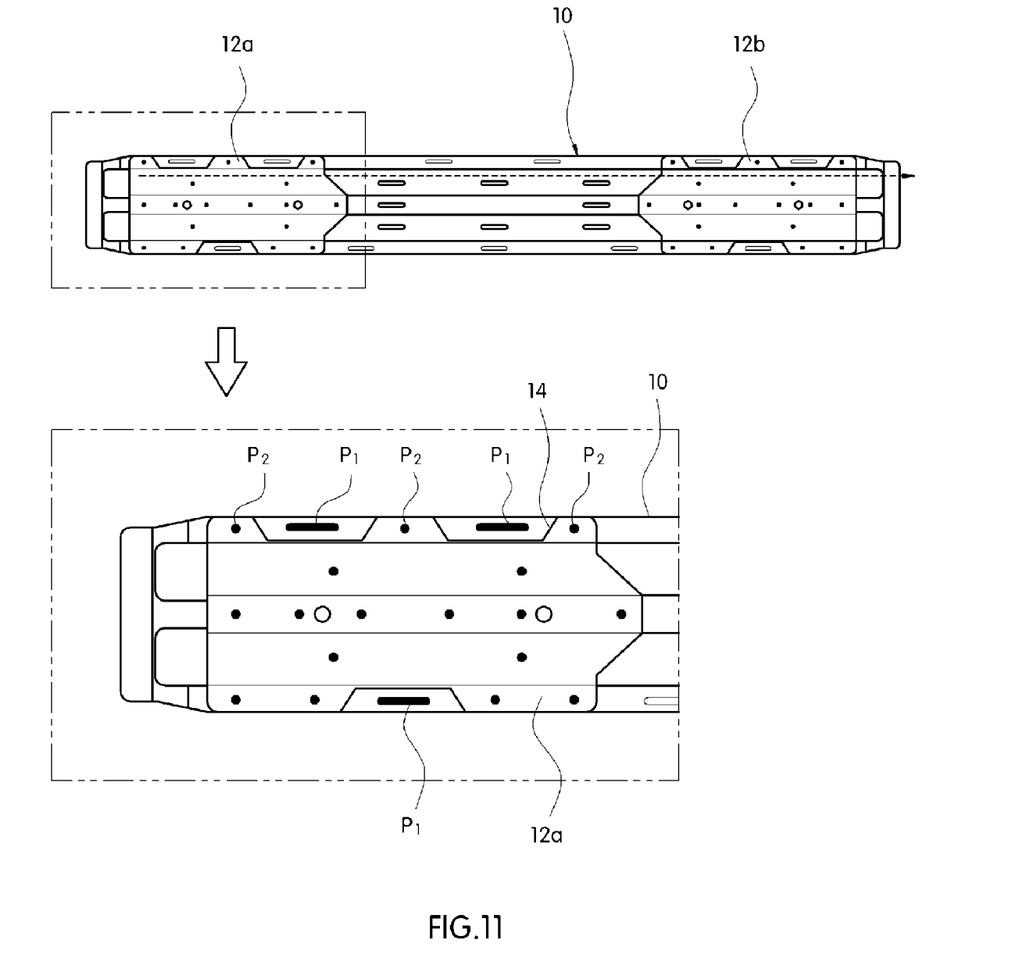
FIG. 11 is a view illustrating the exemplary roof rail according to the present invention in a plan view and an enlarged view.

Thus, as shown in FIG. 11, the shape of the reinforcements is changed, thus providing the seat for applying the sealer in a straight line along the longitudinal ends of the rail body of the roof rail 10, that is, the straight-line shaped sealer applying position $P_1$. Consequently, when the mastic sealer is applied to the upper surface of the roof rail 10 in order to attach the roof rail 10 to the roof panel 11, the mastic sealer is applied to the roof rail 10 in a straight line as shown by the arrow.

That is, since it is possible to apply the sealer under the same conditions as the conventional roof rail (roof rail having no reinforcement), additional equipment investment is not required in a body assembly line. In other words, the roof rail according to the exemplary embodiment of the present invention enables sealer application work to be performed without changing the existing sealer application equipment. As a result, mastic sealer application work can be more effectively performed.

Further, the present invention performs mastic sealer application work using automated sealer application equipment in place of manually performing the mastic sealer application work, thus achieving superior sealer application quality.

As such, the roof rail according to an exemplary embodiment of the present invention complies with side impact and roof strength standards which are more rigorous in North America, minimizes increase in weight and manufacturing cost, and improves the workability and effect of sealer application work without the necessity of changing a production line of a factory.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof rail reinforcement device for a vehicle, comprising:
   at least a reinforcement attached to a roof rail to increase rigidity, and having a cut part formed by cutting a portion of a flange thereof to ensure therethrough a first sealer applying position formed at a distal end of the roof rail, thus allowing a mastic sealer to be applied to the distal end of the roof rail;
   wherein the reinforcement includes concave portions arranged at regular intervals in a traverse direction thereof and each of the concave portions is in contact at a lower portion and an upper portion thereof with a W-shaped bent part of the roof rail to be received therein when the reinforcement overlaps the roof rail so that the reinforcement and the roof rail are welded to each other through contact points thereof.

2. The roof rail reinforcement device of claim 1, wherein the at least a reinforcement has a cross-section which is bent in a W-shape in a transverse direction thereof and includes concave portions and a lower portion formed between the concave portions.

3. The roof rail reinforcement device of claim 2, wherein the concave portions of the at least a reinforcement are received between corresponding lateral sides of the roof rail and a corresponding lateral side of the roof rail and a corresponding concave portion are spaced with a predetermined distance.

4. The roof rail reinforcement device of claim 3, wherein the lower portion is fixed to the roof rail.

5. The roof rail reinforcement device of claim 4, wherein the first sealer applying portion of the roof rail is overlapped to the cut part of the at least a reinforcement to allow the mastic sealer to be applied thereto through the cut part.

6. The roof rail reinforcement device of claim 1, wherein the at least a reinforcement comprises a first reinforcement and a second reinforcement which are attached, respectively, to opposite distal ends of the roof rail, each of the first and second reinforcements having a cut part formed by cutting a portion of a flange thereof to ensure therethrough a first sealer applying position formed at a distal end of the roof rail, thus allowing a mastic sealer to be applied to the distal end of the roof rail.

7. The roof rail reinforcement device of claim 6, wherein the first and second reinforcements have a cross-section which is bent in a W-shape in a transverse direction thereof and includes respectively concave portions and a lower portion formed between the concave portions.

8. The roof rail reinforcement device of claim 7, wherein the concave portions of the first and second reinforcements are received between corresponding lateral sides of the roof rail and a corresponding lateral side of the roof rail and a corresponding concave portion are spaced with a predetermined distance.

9. The roof rail reinforcement device of claim 8, wherein the lower portion is fixed to the roof rail.

10. The roof rail reinforcement device of claim 9, wherein the first sealer applying portion of the roof rail is overlapped to the cut part of the first and second reinforcements to allow the mastic sealer to be applied thereto through the cut part.

* * * * *